(12) United States Patent
Bifulco et al.

(10) Patent No.: US 10,808,613 B2
(45) Date of Patent: Oct. 20, 2020

(54) ASSEMBLY FOR RELEASABLE LOCKING OF A SPINNER OR NOSECONE TO AN ENGINE STRUCTURE

(71) Applicant: United Technologies Corporation, Farmington, CT (US)

(72) Inventors: Anthony R. Bifulco, Ellington, CT (US); Joseph M. Wilson, Jupiter, FL (US); Jason B. Hickman, Palm Beach Gardens, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 290 days.

(21) Appl. No.: 15/865,998

(22) Filed: Jan. 9, 2018

(65) Prior Publication Data

US 2019/0211839 A1    Jul. 11, 2019

(51) Int. Cl.
*F02C 7/04* (2006.01)
*F01D 5/02* (2006.01)
(Continued)

(52) U.S. Cl.
CPC ............ *F02C 7/04* (2013.01); *B64C 11/14* (2013.01); *F01D 5/026* (2013.01); *F01D 5/066* (2013.01); *F02K 3/06* (2013.01); *F04D 29/329* (2013.01); *F05D 2220/323* (2013.01); *F05D 2220/36* (2013.01); *F05D 2230/70* (2013.01);
(Continued)

(58) Field of Classification Search
CPC ........... B64C 11/14; F02C 7/04; F01D 25/243
See application file for complete search history.

(56) References Cited

U.S. PATENT DOCUMENTS

| 2,509,096 A | 5/1950 | Fulton et al. |
| 2,534,662 A | 12/1950 | Froom |

(Continued)

FOREIGN PATENT DOCUMENTS

| CN | 203476508 U | 3/2014 | |
| FR | 3053430 A1 * | 1/2018 | ................ F02C 7/04 |

(Continued)

OTHER PUBLICATIONS

European Patent Office, Extended European Search Report, Application No. 19151051.0-1006, dated Mar. 8, 2019 (8 pp.).

*Primary Examiner* — Moshe Wilensky
*Assistant Examiner* — Cameron A Corday
(74) *Attorney, Agent, or Firm* — Cantor Colburn LLP

(57) ABSTRACT

Disclosed is an assembly for a gas turbine engine, the assembly includes: a spinner or nosecone comprising a threaded rear portion, an engine structure comprising a threaded front portion, the nosecone being threadingly connected to the engine structure, wherein rotation of the spinner or nosecone about the engine structure in a first direction secures the spinner or nosecone to the engine structure and rotation of the spinner or nosecone about the engine structure in a second direction releases the spinner or nosecone from the engine structure; and a lock ring slidingly connected to the engine structure to slide between: a forward position to engage the spinner or nosecone and block rotation of the spinner or nosecone in the second direction, and a rearward position, where the lock ring is spaced from the spinner or nosecone.

15 Claims, 2 Drawing Sheets

(51) Int. Cl.
  *F01D 5/06* (2006.01)
  *F02K 3/06* (2006.01)
  *B64C 11/14* (2006.01)
  *F04D 29/32* (2006.01)

(52) U.S. Cl.
  CPC ...... *F05D 2240/20* (2013.01); *F05D 2260/30* (2013.01); *F05D 2260/36* (2013.01); *F05D 2260/52* (2013.01)

(56) References Cited

U.S. PATENT DOCUMENTS

| | | | |
|---|---|---|---|
| 3,942,570 A * | 3/1976 | Bochman, Jr. | F16B 39/10 411/220 |
| 4,863,354 A | 9/1989 | Asselin et al. | |
| 9,540,939 B2 | 1/2017 | Maliniak et al. | |
| 9,759,129 B2 | 12/2017 | Lindsey et al. | |
| 2017/0122472 A1 | 5/2017 | Meza et al. | |
| 2018/0171932 A1 * | 6/2018 | De Sousa | F01D 25/162 |

FOREIGN PATENT DOCUMENTS

| | | |
|---|---|---|
| GB | 570278 A | 6/1945 |
| GB | 1453458 A | 10/1976 |

* cited by examiner

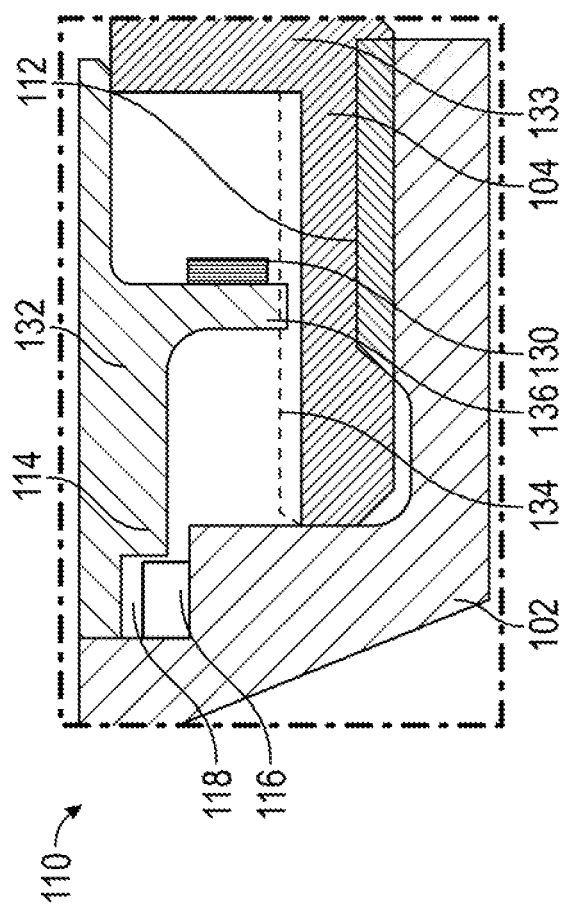
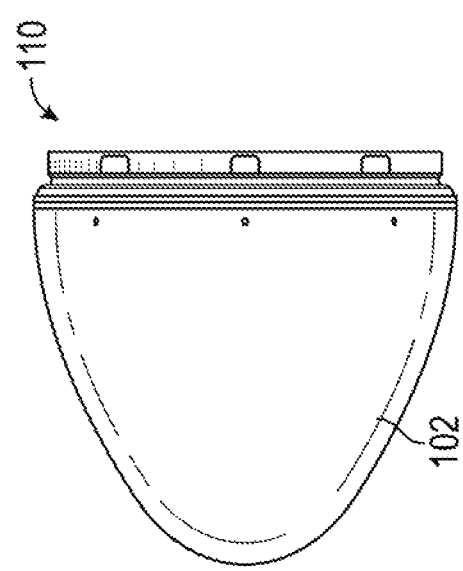
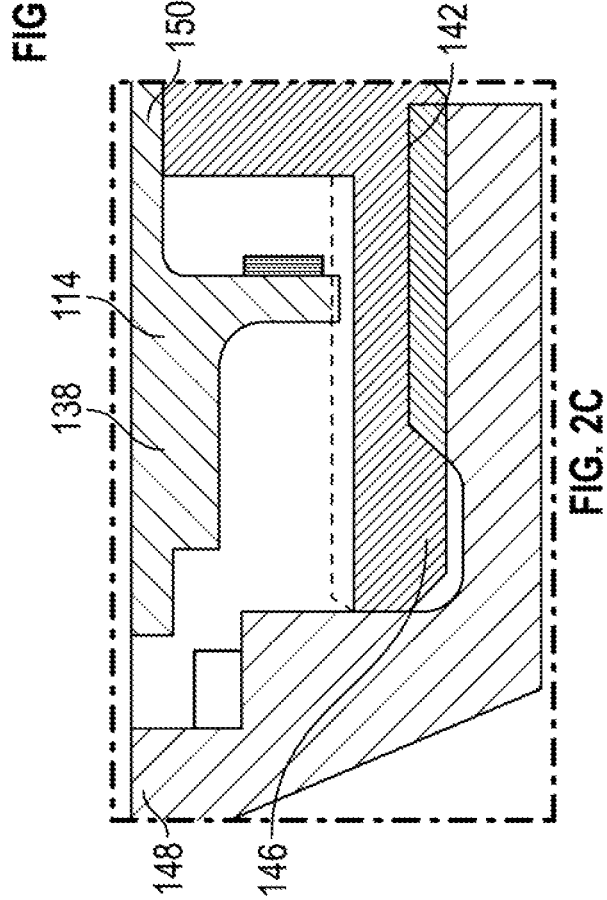

ASSEMBLY FOR RELEASABLE LOCKING OF A SPINNER OR NOSECONE TO AN ENGINE STRUCTURE

BACKGROUND

Exemplary embodiments pertain to the art of spinners and nosecones for gas turbine engines and more specifically to locking of spinners and nosecones against engine structures of gas turbine engines.

Spinners and nosecones that are threaded onto gas turbine engines at assembly may require a lock connector which is assembled with specialized hardware and the lock connector may be permanently deformed upon locking. Removal of the spinners and nosecones may require destroying the connector. Obtaining a replacement for the destroyed connector may cause delays as well as the need to inventory the unique lock hardware at the location where removal is required, which may not be anticipated. As a result, spinners and nosecones may be installed using bolts to avoid assembly issues associated with single use lock connectors, and such ad-hoc modifications may introduce a number of associated drawbacks.

BRIEF DESCRIPTION

Disclosed is an assembly for an gas turbine engine, the assembly comprising: a spinner or nosecone comprising a threaded rear portion, an engine structure comprising a threaded front portion, the spinner or nosecone being threadingly connected to the engine structure, wherein rotation of the spinner or nosecone about the engine structure in a first direction secures the spinner or nosecone to the engine structure and rotation of the spinner or nosecone about the engine structure in a second direction releases the spinner or nosecone from the engine structure; and a lock ring slidingly connected to the engine structure to slide between: a forward position to engage the spinner or nosecone and block rotation of the spinner or nosecone in the second direction, and a rearward position, where the lock ring is spaced from the spinner or nosecone.

In addition to the above disclosed features, or as an alternative, the rear portion of the spinner or nosecone includes a boss protruding rearwardly, and the lock ring includes a groove, and when the lock ring is in the forward position the groove receives the boss blockingly engages the boss to prevent rotation of the spinner or nosecone in the second direction.

In addition to the above disclosed features, or as an alternative, the boss has a rectangular plan area and when the lock ring engages the boss and blocks the spinner or nosecone from rotation in the second direction.

In addition to the above disclosed features, or as an alternative, a biasing member biases the lock ring to the forward position to engage the spinner or nosecone.

In addition to the above disclosed features, or as an alternative, the biasing member is a spring disposed between a rear portion of the lock ring and a second boss extending outwardly from the front portion of the engine structure.

In addition to the above disclosed features, or as an alternative, the front portion of the engine structure includes a second groove that extends rearwardly away from the spinner or nosecone, and the lock ring includes a third boss that extends into the second groove to maintain rotational alignment of the lock ring against the engine structure.

In addition to the above disclosed features, or as an alternative, the lock ring is slidable from the first position towards the second position to disengage from the spinner or nosecone.

In addition to the above disclosed features, or as an alternative, an outwardly facing surface of the front portion of the engine structure includes the second groove, an inwardly facing surface of the front portion of the engine structure is threaded for threadingly engaging the spinner or nosecone, and an outwardly facing surface of the rear portion of the spinner or nosecone is threaded for threadingly engaging the engine structure.

In addition to the above disclosed features, or as an alternative, the outwardly facing surface of the lock ring is co-planar with at least a second outwardly facing surface of the rear portion of the spinner or nosecone.

In addition to the above disclosed features, or as an alternative, the engine structure is a fan hub.

Further disclosed is a gas turbine engine including an engine structure, the engine structure comprising a spinner or nosecone containing one or more of the above disclosed features. Further disclosed is a method of removing a spinner or nosecone from an engine structure of a gas turbine engine, comprising: sliding a lock ring on an engine structure away from the spinner or nosecone to disengage the lock ring from the spinner or nosecone, and rotating the spinner or nosecone in a direction to remove the spinner or nosecone from the engine structure.

BRIEF DESCRIPTION OF THE DRAWINGS

The following descriptions should not be considered limiting in any way. With reference to the accompanying drawings, like elements are numbered alike:

FIGS. 2A-2C illustrate an assembly for releasable locking of a spinner to a fan hub according to an embodiment.

DESCRIPTION

Figure 1:
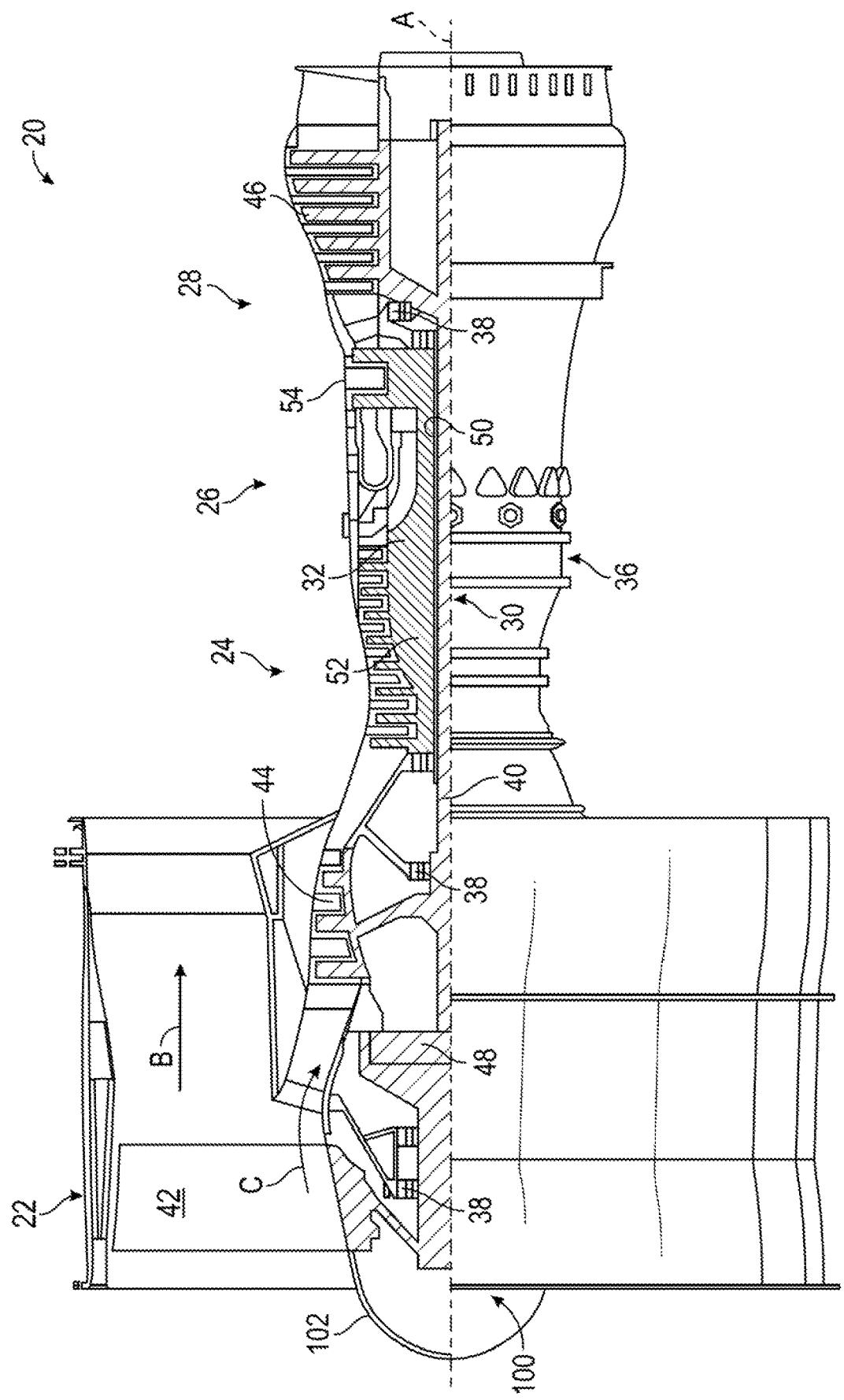
FIG. 1 illustrate a is partial sectional view of a gas turbine engine according to an embodiment.

A detailed description of one or more embodiments of the disclosed apparatus and method are presented herein by way of exemplification and not limitation with reference to the Figures.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]0.5$. The "Low corrected fan tip speed" as disclosed herein according to one non-limiting embodiment is less than about 1150 ft/second (350.5 m/sec).

Turning to FIGS. 2A-2C, disclosed is an assembly 100 for an engine structure 22 which is a fan hub 104 of a fan section 22 of a gas turbine engine 20. The assembly may include a spinner 102 having a threaded rear portion 110 and the fan hub 104 has a threaded front portion 112. The spinner 102 may be threadingly connected to the fan hub 104. Rotation of the spinner 102 about the fan hub in a first direction may secure the spinner 102 to the fan hub and rotation of the spinner 102 about the fan hub in a second direction may release the spinner 102 from the fan hub 104.

The figures herewith and disclosure herein are directed to an embodiment wherein the spinner 102 is attached to the fan hub 104. However, the present disclosure is applicable to gas turbine engines having nosecones attached to engine fixed structures. One applicable engine platform with a nosecone attached to an engine fixed structure includes the F100 afterburning turbofan engine manufactured by Applicant.

Turning back to the figures, a lock ring 114 may be slidingly connected to the fan hub 104 to slide between a forward position to engage the spinner 102 and block rotation of the spinner 102 in the second direction. The lock ring 114 may slide in a rearward position, where the lock ring may be disengaged from the spinner 102.

The rear portion 110 of the spinner 102 may include a tab or first boss 116 which may be an anti-rotation boss protruding rewardly. The boss 116 may have a substantially rectangular plan area. The lock ring 114 may include a groove 118 which may be an anti-rotation groove, sized and shaped to receive the boss 116. When the lock ring 114 is in the forward position the groove 118 may receive the boss 116 and blockingly engage the boss 116 to prevent rotation of the spinner 102 in the second direction.

As illustrated in FIG. 2B, a biasing member 130 may bias the lock ring 114 to the forward position to engage the spinner 102. More specifically, the biasing member 130 may be a spring, which more specifically may be an annular wave spring. The spring 130 may be disposed between a rear portion 132 of the lock ring 114 and a second boss 133 (or projection) extending radially outwardly from the front portion 112 of the fan hub 104. As illustrated in FIG. 2C, the lock ring 114 may be movable by a mechanic in a rearward direction to disengage the lock ring 114 from the spinner 102.

The front portion 112 of the fan hub 104 may include a second groove 134 that may extend rearwardly, away from the spinner 102. The lock ring 114 may include a third boss 136 that may extend into the second groove 134 to maintain rotational alignment of the lock ring 114 against the fan hub 104.

An outwardly facing surface 142 of the front portion 112 of the fan hub 104 may include the second groove 134. An inwardly facing surface 144 of the front portion 112 of the fan hub 104 may be threaded for threadingly engaging the spinner 102. An outwardly facing surface 146 of the rear portion 110 of the spinner 102 may be threaded for threadingly engaging the fan hub 104. For aerodynamic purposes, an outwardly facing surface 138 of the lock ring 114 may be flush, e.g., co-planar, with at least a second outwardly facing surface 148 of the rear portion 110 of the spinner 102.

In addition, a rearwardly extending portion 150 of the lock ring 114, which is structurally defined in part by the outwardly facing surface 138 of the lock ring 113, may slide over the second boss 133 of the fan hub 104. This configuration may support the lock ring 114 and provide an aerodynamic seal.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly for a gas turbine engine, the assembly comprising:
    a spinner or nosecone comprising a threaded rear portion,
    an engine structure comprising a threaded front portion, whereby the spinner or nosecone is threadingly connected to the engine structure,
        wherein rotation of the spinner or nosecone about the engine structure in a first direction secures the spinner or nosecone to the engine structure and rotation of the spinner or nosecone about the engine structure in a second direction releases the spinner or nosecone from the engine structure; and
    a lock ring slidingly connected to the engine structure to slide between:
        a forward position to engage the spinner or nosecone and block rotation of the spinner or nosecone in the second direction, and
        a rearward position, where the lock ring is spaced from the spinner or nosecone,
    wherein:
        the rear portion of the spinner or nosecone includes a boss protruding rearwardly, and the lock ring includes a groove, and when the lock ring is in the forward position the groove receives the boss and blockingly engages the boss to prevent rotation of the spinner or nosecone in the second direction; and
        the boss has a rectangular plan area and when the lock ring is in the forward position, the lock ring engages the boss and blocks the spinner or nosecone from rotation in the second direction.

2. The assembly of claim 1, wherein a biasing member biases the lock ring to the forward position to engage the spinner or nosecone.

3. The assembly of claim 2, wherein the biasing member is a spring disposed between a rear portion of the lock ring and a second boss extending outwardly from the front portion of the engine structure.

4. The assembly of claim 3, wherein the front portion of the engine structure includes a second groove that extends rearwardly away from the spinner or nosecone, and the lock ring includes a third boss that extends into the second groove to maintain rotational alignment of the lock ring against the engine structure.

5. The assembly of claim 4, wherein the lock ring is slidable from the first position towards the second position to disengage from the spinner or nosecone.

6. The assembly of claim 5, wherein an outwardly facing surface of the front portion of the engine structure includes the second groove, an inwardly facing surface of the front portion of the engine structure is threaded for threadingly engaging the spinner or nosecone, and an outwardly facing surface of the rear portion of the spinner or nosecone is threaded for threadingly engaging the engine structure.

7. The assembly of claim 6, wherein the outwardly facing surface of the lock ring is co-planar with at least a second outwardly facing surface of the rear portion of the spinner or nosecone.

8. The assembly of claim 1, wherein the engine structure is a fan hub.

9. A gas turbine engine including an engine structure, the engine structure comprising:
    a spinner or nosecone comprising a threaded rear portion,
    wherein the engine structure comprises a threaded front portion, whereby the spinner or nosecone is threadingly connected to the engine structure,
        wherein rotation of the spinner or nosecone about the engine structure in a first direction secures the spinner or nosecone to the engine structure and rotation of the spinner or nosecone about the engine structure in a second direction releases the spinner or nosecone from the engine structure; and
    a lock ring slidingly connected to the engine structure to slide between:
        a forward position to engage the spinner or nosecone and block rotation of the spinner or nosecone in the second direction, and
        a rearward position, where the lock ring is spaced from the spinner or nosecone,
    wherein:
        the rear portion of the spinner or nosecone includes a boss protruding rearwardly, and the lock ring includes a groove, and when the lock ring is in the forward position the groove receives the boss and blockingly engages the boss to prevent rotation of the spinner or nosecone in the second direction; and
        the rear position of the spinner or nosecone includes a boss protruding rearwardly, and the lock ring includes a groove, and when the lock ring is in the forward position, the groove receives the boss and blockingly engages the boss to prevent rotation of the spinner or nosecone in the second direction.

10. The gas turbine engine of claim 9, wherein a biasing member biases the lock ring to the forward position to engage the spinner or nosecone.

11. The gas turbine engine of claim 10, wherein the biasing member is a spring disposed between a rear portion of the lock ring and a second boss extending outwardly from the front portion of the engine structure.

12. The gas turbine engine of claim 11, wherein the front portion of the engine structure includes a second groove that extends rearwardly away from the spinner or nosecone, and the lock ring includes a third boss that extends into the second groove to maintain rotational alignment of the lock ring against the engine structure.

13. The gas turbine engine of claim 12, wherein the lock ring is slidable from the first position towards the second position to disengage from the spinner or nosecone.

14. The gas turbine engine of claim 13, wherein an outwardly facing surface of the front portion of the engine structure includes the second groove, an inwardly facing surface of the front portion of the engine structure is threaded for threadingly engaging the spinner or nosecone, and an outwardly facing surface of the rear portion of the spinner or nosecone is threaded for threadingly engaging the engine structure.

15. A method of removing a spinner or nosecone from an engine structure of a gas turbine engine, comprising:
sliding a lock ring on an engine structure away from the spinner or nosecone to disengage the lock ring from the spinner or nosecone, and
rotating the spinner or nosecone in a direction to remove the spinner or nosecone from the engine structure, wherein:
the spinner or nosecone comprises a threaded rear portion,
wherein rotation of the spinner or nosecone about the engine structure in a first direction secures the spinner or nosecone to the engine structure and rotation of the spinner or nosecone about the engine structure in a second direction releases the spinner or nosecone from the engine structure; and
the lock ring is slidingly connected to the engine structure to slide between:
a forward position to engage the spinner or nosecone and block rotation of the spinner or nosecone in the second direction, and
a rearward position, where the lock ring is spaced from the spinner or nosecone,
wherein,
the rear portion of the spinner or nosecone includes a boss protruding rearwardly, and the lock ring includes a groove, and when the lock ring is in the forward position the groove receives the boss and blockingly engages the boss to prevent rotation of the spinner or nosecone in the second direction; and
the boss has a rectangular plan area and when the lock ring is in the forward position, the lock ring engages the boss and blocks the spinner or nosecone from rotation in the second direction.

* * * * *